United States Patent
Watanabe et al.

[19]

[11] Patent Number: 6,070,801
[45] Date of Patent: Jun. 6, 2000

[54] BAR CODE READER, BAR CODE READING METHOD AND COMPUTER READABLE MEDIUM

[75] Inventors: Mitsuo Watanabe; Isao Iwaguchi; Shinichi Sato; Hiroaki Kawai; Motohiko Itoh, all of Kawasaki, Japan

[73] Assignee: Fujitsu Limited, Kawasaki, Japan

[21] Appl. No.: 09/046,577

[22] Filed: Mar. 24, 1998

[30] Foreign Application Priority Data

Aug. 8, 1997 [JP] Japan .................................. 9-214743

[51] Int. Cl.[7] ...................................................... G06K 7/10
[52] U.S. Cl. ...................... 235/462.16; 235/454; 235/437
[58] Field of Search .................................... 235/462, 437, 235/462.01, 462.16, 462.1, 462.12, 462.09; 234/454, 462

[56] References Cited

U.S. PATENT DOCUMENTS

| | | | |
|---|---|---|---|
| 5,414,252 | 5/1995 | Shinoda et al. | 235/462 |
| 5,438,188 | 8/1995 | Surka | 235/462 |
| 5,457,308 | 10/1995 | Spitz et al. | 235/462 |
| 5,478,999 | 12/1995 | Figarella et al. | 235/462 |
| 5,493,108 | 2/1996 | Cherry et al. | 235/454 |
| 5,519,199 | 5/1996 | Watanabe et al. | 235/463 |
| 5,525,784 | 6/1996 | Kawai et al. | 235/437 |
| 5,525,785 | 6/1996 | Kawai et al. | 235/437 |
| 5,686,715 | 11/1997 | Watanabe et al. | 235/462 |
| 5,777,310 | 7/1998 | Liu et al. | 235/462 |
| 5,780,832 | 7/1996 | Watanabe et al. | 235/462 |
| 5,798,510 | 5/1996 | Watanabe et al. | 235/462 |

FOREIGN PATENT DOCUMENTS

| | | | |
|---|---|---|---|
| 0066680 | 3/1982 | European Pat. Off. | 235/463 |
| 7-244706 | 9/1995 | Japan . | |

*Primary Examiner*—Michael G Lee
*Assistant Examiner*—Daniel S Fellen
*Attorney, Agent, or Firm*—Armstrong, Westerman, Hattorri, McLeland & Naughton

[57] ABSTRACT

Demodulated data B containing the whole of a right block and a part of a left block is obtained after demodulated data A containing a start guard bar and based on a division reading process has been at first obtained. When demodulated data C containing an end guard bar and numerical data of three characters is thereafter obtained, a CPU aligns the demodulated data C with modulus 10-OK data obtained by synthesizing the demodulated data A with the demodulated data B on the basis of the end guard bar, and compares tenth through twelfth characters (of the numerical data) of both of data with each other. As a result of this comparison, if the tenth through twelfth characters (of the numerical data) of both of data are coincident with each other, the CPU increments an identical character counter.

11 Claims, 12 Drawing Sheets

FIG. 8

| | T2 MODULE NUMBER | | | |
|---|---|---|---|---|
| | 2 | 3 | 4 | 5 |
| T1 MODULE NUMBER  2 | E6 | 00 | E4 | 06 |
| 3 | 09 | E2 / E8 | 01 / 07 | E5 |
| 4 | E9 | 02 / 08 | E1 / E7 | 05 |
| 5 | 06 | E0 | 04 | E3 |

FIG. 9

| B1 \ B3 | 1 | 2 | 3 |
|---|---|---|---|
| 1 | E7 / E8 | 01 | — |
| 2 | 02 | E1 / E2 | 07 |
| 3 | — | 08 | — |

BAR CODE READER, BAR CODE READING METHOD AND COMPUTER READABLE MEDIUM

BACKGROUND OF THE INVENTION

1. Field of the Invention

The present invention relates to a bar code reader for and a bar code reading method of reading bar codes in which identifying bars are disposed at two ends and at the center and 2-block data characters are interposed between respective identifying bars such as a UPC code, an EAN code and a JAN code, and to a computer readable medium for storing a program for such a reading process, and more particularly to a reader and a reading method capable of reproducing demodulated data with respect to the whole bar codes by synthesizing plural pieces of demodulated data obtained by partially reading the bar codes.

2. Description of the Related Art

In recent years, it has been generalized that commercial goods are managed by bar codes as typified by a POS system in distribution industries etc. For example, in the POS system in a shop, pieces of information on classifications and sales prices etc of the goods are coded in a format of the bar code and printed on the goods. The bar code is read at the check-out counter, and a payment is made based on the read information. Then, the number of sold goods is counted in real time, and a result of count serves for an inventory management and a stocking management.

The above bar code is roughly classified into a fixed length code such as a JAN code, a UPC code and an EAN code, and into a variable length second code. This fixed length code has a start guard bar (SGB) added to a left end thereof, a center bar (CB) inserted in a middle portion thereof and an end guard bar (EGB) added to the right end thereof. A left data block consisting of six or four data characters is provided between the start guard bar and the center bar, and a right data block consisting of six or four data characters is provided between the center bar and the end guard bar. This pattern of these guard bars and the center bar are predetermined by the specification, and therefore a bar code reader is capable of detecting these guard bars and center bar.

Further, the bar code reader is capable of reading the data character (a coded numerical values or symbolic minimum unit) of the bar code on the basis of the guard bars and the center bar. There are three reading methods, i.e., a continuous reading method, a block reading method and a division reading method. The continuous reading method is such that when detecting the two guard bars and the center bar by one bar code scanning process, the data characters interposed between the two guard bars are recognized and demodulated as a bar code. Further, the block reading method is that only the block of the data characters is recognized as a bar code though the block is interposed by only one guard and the center bar, and, after separately demodulating the two blocks, demodulated data of these respective blocks are synthesized (integrated), thereby reproducing the data modulated into the single bar code. Moreover, according to the division reading method, even a data character string contiguous to the single guard bar at the minimum or the center bar is recognized as a bar code, and fragments of the demodulated data of those data characters that have been separately read are synthesized, thereby reproducing the demodulated data corresponding to the whole single bar code.

In the above-described block reading method, only the data characters interposed between the guard bars and the center bar of the bar code are conceived as valid data aged extracted from ambient data, and hence data noises based on portions excluding the bar code are efficiently eliminated. Hence, there is less of a possibility of misreading the block data, and consequently a bar code demodulation processing time may be short. Accordingly, an in-store marking bar code labeled in a retail store on a fresh foods, etc., with difficulty of source marking, has hitherto been treated as one in which the data demodulation is completed only when the same demodulated data is reproduced at least twice on the basis of the continuous reading method or the block reading method in order to prevent the misreading.

The in-store marking is, however, carried out by sticking a paper label printed with the bar code on a surface of the goods or a wrapping paper of the goods, and therefore it might happen that the bar code distorts due to corrugations of the goods or of the wrapping paper of the goods when reading the bar code. Accordingly, there is only a small possibility in which the block data can be demodulated by one bar code scanning process. As a result, it takes a long time until two or more reproducing processes of the same demodulated data by the block reading are finished.

To obviate this problem, it can be considered to deal with the data demodulation as being completed immediately when the demodulated data corresponding to the whole bar code is reproduced once by the block reading process. According to such a method of obviating the problem, however, it is impossible to eliminate the misreading attributed to the reverse reading of the right block as will hereinafter be explained.

That is, in the above-described fixed length code, as shown in FIG. 14, the center bar (CB) is constructed of five white/black/white/black/white modules, while the end guard bar (EGB) is constructed of three black/white/black modules. Therefore, as illustrated in FIG. 14, there is only one module of an end margin, in which case when a scan beam starts scanning the bar code from the center bar (CB) without passing through over a sixth character (C6) of the left block (or alternatively when the scan of the bar code is ended at the center bar (CB)), a pattern of the end margin (white) plus the end guard bar (black/white/black) plus the seventh module (white) of the twelfth character, becomes identical with a pattern of the center bar (white/black/white/black/white), and it follows that a pattern of the second module through fourth module (black/white/black) of the center bar becomes the same as the pattern of the end guard bar (black/white/black). Besides, as in the case shown in FIGS. 15 or 16, if the right block is constructed of only the data characters (E-0, E-1, E-5) in which the seventh module solely constitutes the white bar, and even when reading the code reversely by shifting a boundary between the data characters to between the sixth module and the seventh module, it follows that a data character string for one block is apparently constituted (however, E-0 is replaced with E-5). Accordingly, there might be a possibility in which the demodulating device is incapable of distinguishing a direction in which the scan has been done based on an external configuration of the bar width data, and therefore demodulates a bar width data set produced by the scan effected in a certain direction as bar width data produced by the scan effected in the direction opposite to the above scan direction. In this case, as explained above, E-0 is replaced with E-5, and hence it follows that the data demodulated becomes absolutely different from the data that must have been originally demodulated. This is a misreading attributed to the reverse reading of the right block. Note that the center bar (CB) might be also replaced with the guard bar (SGB)

in the left block. Unlike the right block composed of the data characters of even-numbered parities, however, the data characters of odd-numbered parities are contained in the left block, and besides an arrangement of the even-numbered parity data characters and the odd-numbered parity data characters is restricted to a predetermined arrangement by a protocol. Consequently, the misreading caused by the reverse reading does not occur.

SUMMARY OF THE INVENTION

It is an object of the present invention to provide a bar code reader and a bar code reading method that are capable of completing a demodulation for a short period of time without causing any misreading due to reverse reading of a right block by checking whether or not plural pieces of demodulated data are overlapped in only the right block when demodulated data corresponding to a whole bar code are reproduced on the basis of demodulated data once obtained by a block reading process or a division reading process, and to a computer readable medium stored with a program for such a reading process.

To accomplish the above object, according to a first aspect of the present invention, there is provided a bar coder reader scanning a bar code containing three identifying bars each having a fixed pattern and data characters of two blocks interposed between the identifying bars, detecting a bright/dark pattern on a trajectory of the scanning, and demodulating data coded into the bar code on the basis of the bright/dark pattern. The reader comprises a demodulating unit obtaining plural pieces of demodulated data by demodulating the bright/dark patterns on the trajectories each passing through at least one of the three identifying bars; a demodulated data synthesizing unit obtaining the demodulated data corresponding to all of the bar code by synthesizing the plural pieces of demodulated data obtained by said demodulating unit; an overlap judging unit judging whether or not the plural pieces of demodulated data obtained by that said demodulating unit demodulates the bright/dark patterns on the trajectories each passing through any one of the blocks overlap at least partially in the block; a coincidence judging unit judging whether or not overlapped portions of the plural pieces of demodulated data judged by said overlap judging unit as being overlapped are coincident with each other; and a demodulated data validating unit validating the demodulated data reproduced by said demodulated data synthesizing unit only when said coincidence judging unit judges that the overlapped portions are coincident with each other.

With this construction, the demodulating unit demodulates each of the bright/dark patterns on each of the trajectories, each passing through at least one of the three identifying bars, thereby obtaining the plural pieces of demodulated data. The demodulated data synthesizing unit obtains the demodulated data corresponding to all of the bar code by synthesizing these plural pieces of demodulated data. On the other hand, the overlap judging unit judges whether or not the plural pieces of demodulated data obtained based on the bright/dark patterns on the trajectories, each passing through any one of the blocks, overlap at least partially the block. As a result of this judgement, when making a judgement of being overlapped with each other, the coincidence judging unit judges whether or not the overlapped portions in the respective pieces of demodulated data are coincident with each other. As a consequence of this judgement, only when judging that the demodulated portions in the respective pieces of demodulated data are coincident with each other, the demodulated data validating unit validates the demodulated data obtained by the demodulated data synthesizing unit. Thus, even when the demodulated data corresponding to all of the bar code are not reproduced a plurality of times, the demodulated data once synthesized are validated only when the plural pieces of demodulated data obtained by reading the specified block are coincident with each other at least partially. Accordingly, the reproduction of the demodulated data corresponding to the whole bar code is completed for a short time without any decline of a reliability of the reproduced result.

The bar code read by the bar code reader according to the present invention may be exemplified by fixed length codes such as a UPC code, a JAN code and an EAN code etc.

The overlap judging unit may judge whether or not the plural pieces of demodulated data synthesized by the demodulated data synthesizing unit for reproducing the demodulated data corresponding to the whole bar code, are overlapped in the block. The overlap judging unit may also judge whether or not one piece of the demodulated data of those synthesized by the demodulated data synthesizing unit in order to reproduce the demodulated data corresponding to the whole bar code and the demodulated data obtained after being synthesized, are overlapped in the block. Further, the overlap judging unit may make a judgement of being overlapped in all cases where the overlapped portions have one or more characters, and may also make a judgement of being overlapped only when there are a plurality of overlapped portions.

According to a second aspect of the present invention, the bar code to be demodulated is the UPC code, the JAN code or the EAN code, and the identifying bars are respectively a start guard bar, a center bar, and an end guard bar.

According to a third aspect of the present invention, one of the blocks is interposed between the center bar and the end guard bar.

According to a fourth aspect of the present invention, the overlap judging unit judges whether or not the demodulated data obtained by the demodulating unit after the demodulated data synthesizing unit has synthesized the demodulated data and any one piece of demodulated data of the data synthesized by the demodulated data synthesizing unit are overlapped at least partially in any one of the blocks.

According to a fifth aspect of the present invention, the overlap judging unit judges whether or not the plural pieces of demodulated data synthesized by the demodulated data synthesizing unit are overlapped at least partially in any one of the blocks.

According to a sixth aspect of the present invention, the overlap judging unit judges that the plural pieces of demodulated data are overlapped when the plural pieces of demodulated data are overlapped by three or more characters.

According to seventh aspect of the present invention, there is provided a bar coder reading method of scanning a bar code containing three identifying bars each having a fixed pattern and data characters of two blocks interposed between the identifying bars, detecting a bright/dark pattern on a trajectory of the scanning, and demodulating data coded into the bar code on the basis of the bright/dark pattern. The method comprises a step of demodulating the bright/dark patterns on the trajectories each passing through at least one of the three identifying bars; a step of obtaining the demodulated data corresponding to all of the bar code by synthesizing the plural pieces of demodulated data obtained by demodulating the bright/dark patterns; and a step of validating the demodulated data corresponding to all of the bar code only when the plural pieces of demodulated data obtained by demodulating the bright/dark patterns on the trajectories each passing through any one of the blocks overlap at least partially in the block and the overlapped portions of each of demodulated data are coincident with each other.

The overlap judging unit may judge whether or not the demodulated data obtained by the demodulating unit after the demodulated data synthesizing unit has synthesized the demodulated data and any one piece of demodulated data synthesized by the demodulated data synthesizing unit are overlapped at least partially in any one of the blocks. The overlap judging unit may also judge whether or not the plural pieces of demodulated data synthesized by the demodulated data synthesizing unit overlap at least partially in any one of the blocks. Further, the overlap judging unit may judge that the plural pieces of demodulated data overlap when the plural pieces of demodulated data overlap by three or more characters.

According to an eighth aspect of the present invention, a computer readable medium stored with a bar code program for enabling a computer to which bright/dark pattern data obtained by scanning a bar code containing three identifying bars each having a fixed pattern and data characters of two blocks interposed between the identifying bars are inputted, to execute: a step of demodulating the bright/dark patterns on the trajectories each passing through at least one of the three identifying bars; a step of obtaining the demodulated data corresponding to all of the bar code by synthesizing the plural pieces of demodulated data obtained by demodulating the bright/dark patterns; a step of judging whether or not the plural pieces of demodulated data obtained by demodulating the bright/dark patterns on the trajectories each passing through any one of the blocks are overlapped at least partially in the block; a step of judging whether or not, when judging that the plural pieces of demodulated data overlap at least partially in the block, the overlapped portions are coincident with each other; and a step of validating the demodulated data corresponding to all of the bar code only when it is judged that the overlapped portions are coincident with each other.

BRIEF DESCRIPTION OF THE DRAWINGS

The invention will be described below in detail with reference to the accompanying drawings, in which:

FIG. 8 is a distance demodulation table;

FIG. 9 is a bar width demodulation table;

DESCRIPTION OF THE PREFERRED EMBODIMENT

An embodiment of the present invention will hereinafter be described with reference to the accompanying drawings.

Figure 1:
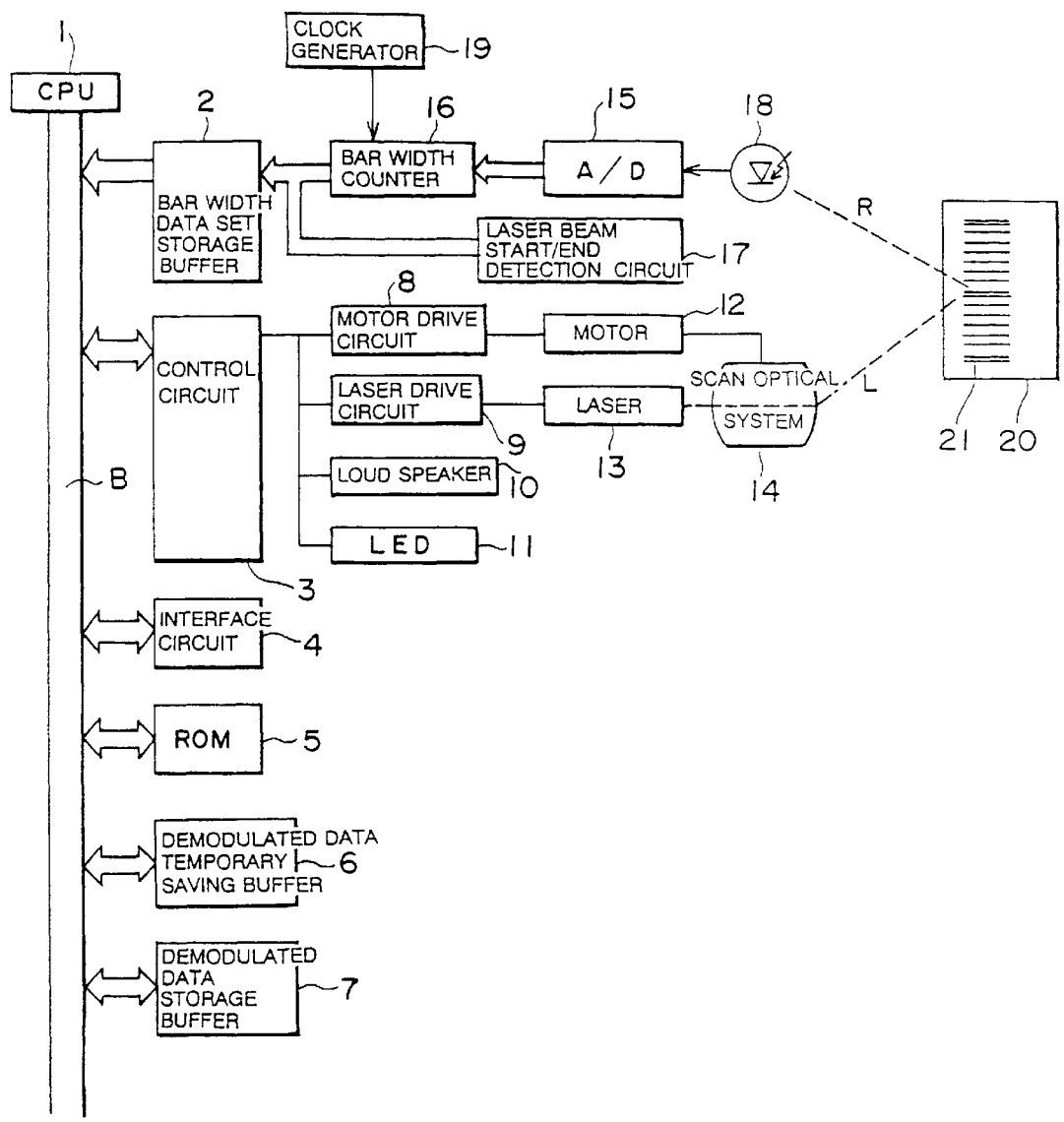
FIG. 1 is a block diagram showing a bar code reader in one embodiment of the present invention.

FIG. 1 is a block diagram showing an outline of a construction of a bar code reader in an embodiment of the present invention. The bar code reader in this embodiment is an apparatus for reading bar codes 21 in which data about a commercial goods 20 are coded in accordance with a format of a UPC code (i.e., bar code constructed of three identifying bars each having a fixed pattern, and 2-block data characters interposed between the respective identifying bars).

(Whole Construction)

Referring to FIG. 1, the bar code reader is provided with a CPU 1, a bar width data set storage buffer 2, a control circuit 3, an interface circuit 4, a ROM 5, a demodulated data temporary saving buffer 6 and a demodulated data storage buffer 7 which are connected via a bus one anther, a bar width counter 16 and a laser beam start/end detection circuit 17 connected to the bar width data set storage buffer 2, a clock 19 and an A/D converter 15 connected to the bar width counter 16, a light receiving element 18 connected to the A/D converter 15, a motor drive circuit 8, a laser drive circuit 9, a speaker 10 and a LED connected to the control circuit 3, a motor connected to the motor drive circuit 8, a scan optical system 14 driven by the motor 12, and a semiconductor laser 13 connected to the laser drive circuit 9.

The ROM 5 is a read-only memory storing a bar code recognizing/demodulating process program as a computer readable medium.

A CPU 1 defined as a computer executes a bar code recognition/demodulation processing program stored in a ROM 5, thereby controlling the whole bar code reader. The CPU 1 also functions as a demodulating mechanism, a demodulated data synthesizing unit, an overlap judging unit, a coincidence judging unit and a demodulated data validating unit, and demodulates a bar width data set obtained by reading the bar codes 21.

The interface circuit 4 controls a status of a bus B and controls a data transmission to an outside device The control circuit 3 controls the motor drive circuit 8, the laser drive circuit 9, the speaker 10 and the light emitting diode (LED) 11. The motor drive circuit 8 drives the motor 12 to rotate a polygon mirror (which is not shown) constituting the scan optical system 14. Further, the laser drive circuit 9 drives a semiconductor laser 13 to emit laser beams L. Further, the speaker 10 emits a voice indicating a completion of reading (demodulating) the bar code. The light emitting diode 11 is a display element for displaying data such as a sales price of the goods 20, which are obtained as a result of the demodulation of the bar code.

The laser beams L emitted from the semiconductor laser 13 are made incident to the scam optical system 14 and deflected by this scan optical system 14. More specifically, the scan optical system 14 deflects the laser beams L in one direction by use of the polygon mirror (not shown) rotated by the motor 12. A plurality of fixed mirrors are fixed on the side opposite to the polygon mirror. Accordingly, the laser beams L deflected by the polygon mirror are re-reflected in various direction by the respective fixed mirrors. As a result, the deflecting direction (which is the scan direction) of the laser beams L is changed to a variety of directions. The scan optical system 14 performs consecutive laser-beam scans in the plurality of directions at a high speed within a period of the deflection by one reflection surface of the polygon mirror. Each of the plurality of laser-beam scans performed within the period of the deflection by one reflection surface of the polygon mirror is hereinafter referred to as "one scan".

When the thus scanning laser beams L strike on the surface (containing a bar code 21) of the goods 20, the laser beams L are irregularly reflected from the surface, and some of reflected beams R are received by the light receiving element (which is the photo diode) 18. The light receiving element 18 outputs electric currents corresponding to brightness and darkness of the reflected light beams R received. The A/D converter 15 compares the electric current outputted by the light receiving element 18 with a predetermined threshold value and converts the current into a binary signal. This binary signal indicates "H" level when an intensity of the reflected beams R corresponds to a reflectivity of the black bar in the bar code 21 and "L" level when the intensity of the reflected beams R corresponds to a reflectivity of the white bar in the bar code 21.

A bar width counter 16 measures a period from a rise timing of the binary signal to a fall timing thereof (which is expected to correspond to a width of the black bar in the bar code 21). The bar width counter 16 also measures a period from the fall timing of the binary signal to the rise timing thereof (which is expected to correspond to a width of the white bar in the bar code 21). Note that the bar width counter 16 counts the number of clocks inputted from a clock 19 for measuring the time corresponding to each of those bar widths. Read data of the respective bars that are outputted from the bar width counter 16 take such a form that the count value and a color distinguishing signal indicating the white or the black are combined. The bar width counter 16 consecutively outputs the read data each time the laser-beam is scanned. A series of the read data that are thus consecutively outputted during each one scan are called as "bar width data set".

The bar width data set outputted from the bar width counter 16 is inputted to a laser beam start/end detection circuit 17. This laser beam start/end detection circuit 17 checks a status of the bar width data set and detects a start timing and an end timing of one scan of laser beams. The laser beam start/end detection circuit 17 then adds to the bar width data set pieces of data indicating the start timing and the end timing.

The bar width data set storage buffer 2 temporarily stores the bar width data set to which the data indicating the start timing and end timing of the laser beams are added. The bar width data set storage buffer 2 sequentially stores the bar width data set inputted from the bar width counter 16 and transfers the bar width data set piece by piece in the sequence in which the data set has been stored in response to a request from the CPU 1.

The demodulated data temporary saving buffer 6 is a memory for storing the demodulated bar width data set. Further, the demodulated data storage buffer 7 is a memory for storing the demodulated data corresponding the whole bar code obtained by synthesizing. Note that a modulus 10-OK flag showing whether the result of a modulus 10 check is OK or not (demodulated data is modulus 10-OK DATA or not) is fixed to the demodulated data stored in the demodulated data storage buffer 7.

(Bar Width Data Set)

Next, a bar width data set stored in the bar width data set storage buffer 2 will be explained with reference to FIGS. 10 through 13. Each of horizontal lines shown in FIGS. 10–13 indicates a scan trajectory of a laser beam L.

Figure 10:
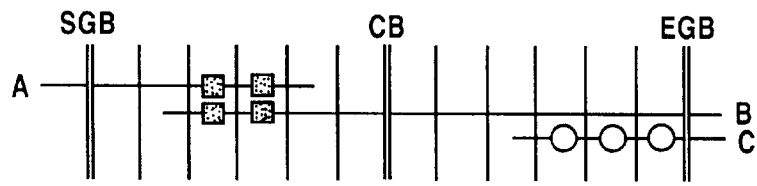
FIG. 10 is an explanatory diagram showing a first operational example.
Figure 11:
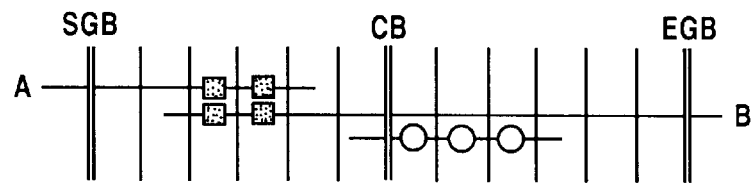
FIG. 11 is an explanatory diagram showing a second operational example.
Figure 13:
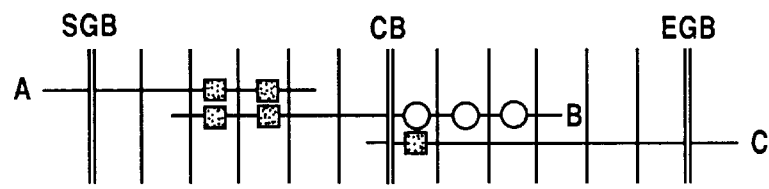
FIG. 13 is an explanatory diagram showing a fourth operational example.
Figure 14:
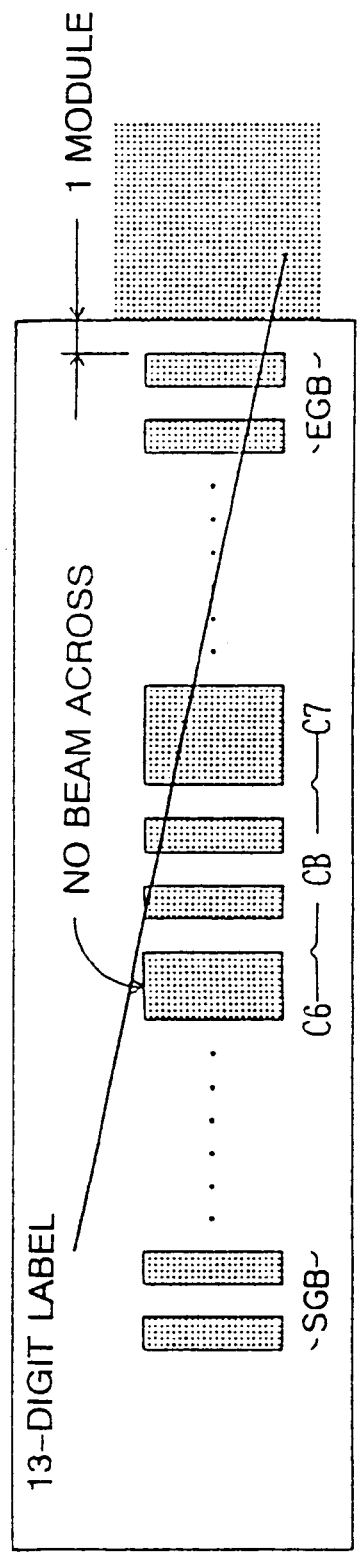
FIG. 14 is an explanatory diagram showing a reverse reading process of a right block of the UPC code.
Figure 15:
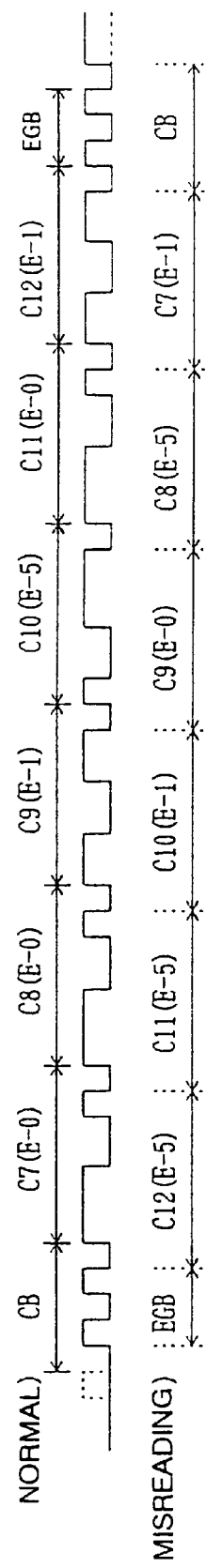
FIG. 15 is an explanatory diagram showing the reverse reading process of the right block of the UPC code.
Figure 16:
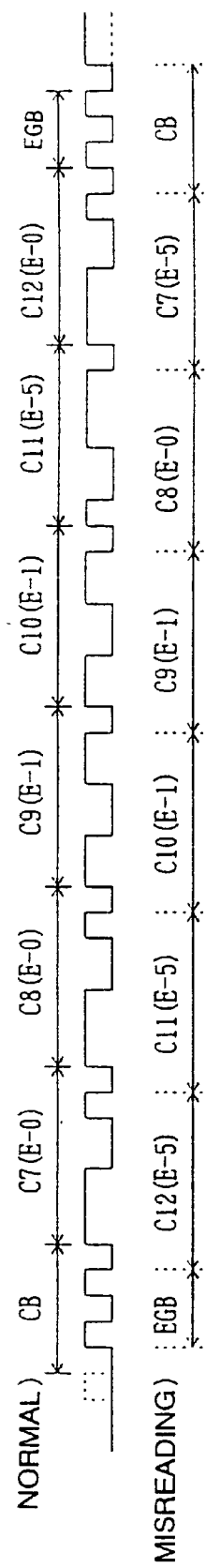
FIG. 16 is an explanatory diagram showing the reverse reading process of the right block of the UPC code.

Among these lines, the lines A, C in FIG. 10, the lines A, C in FIG. 11 and the line A in FIG. 13 are defined as trajectories each passing through only one of a start guard bar (SGB), a center car (CB) and an end guard bar (RGB) that serve as identifying bars. Therefore, a bar width data set read by a scan of the laser beam L along these trajectories is defined as a bright/dark pattern on the scan trajectory passing through one identifying bar and based on a division reading process.

Figure 12:
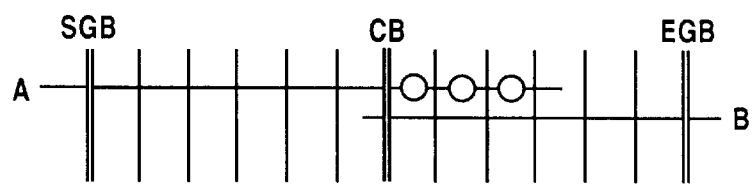
FIG. 12 is an explanatory diagram showing a third operational example.

Further, the line A in FIG. 12 is a trajectory passing through all characters of a left block containing the start guard bar (SGB) and the center bar (CB). The line B in FIG. 10, the line B in FIG. 11, the line B in FIG. 12 and the line C in FIG. 13 are trajectories passing through all the characters of the right block including the center bar C (CB) and the end guard bar (EGB). Accordingly, the bar width data set that has been read is a bright/dark pattern on the scan trajectory passing through the two identifying bars and becomes a bar width data set based on the block reading process.

Further, though not illustrated, according to a trajectory passing through all of the start guard bar (SGB), the center bar (CB) and the end guard bar (EGB), the read bar width data set is the one obtained by continuously reading all the data characters. Namely, such a bar width data set is the bright/dark pattern on the scan trajectory passing through the three identifying bars, and becomes the bar width data set based on the continuous reading process.

(Demodulation Algorithm)

Figure 7:
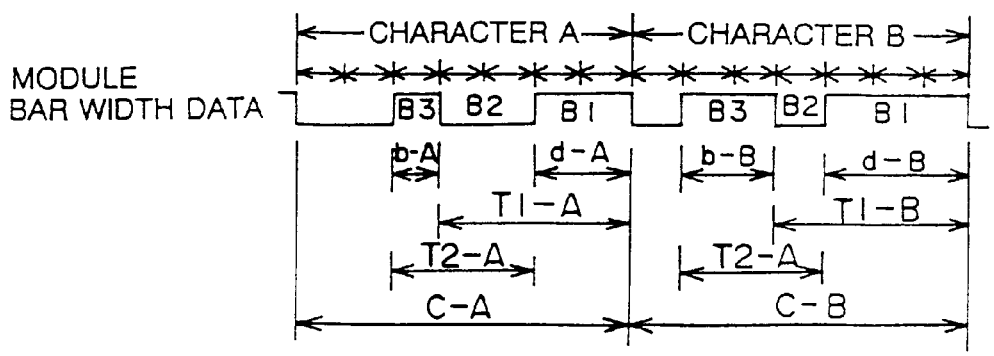
FIG. 7 is a diagram showing a structure of characters of a UPC code.

Next, an outline of a general algorithm for demodulating the UPC code will be explained. Each character in the UPC code is, as illustrated in FIG. 7, composed of a combination of two white bars and two black bars which are formed from each of seven modules (each having a unit length) allocated to white or black. A demodulating unit of the CPU 1 calculates a sum length (which is called a T1 module) of a length of a tail black bar (B1) of each character and a length of a white bar (B2) just anterior thereto. The same demodulating unit calculates also a sum length (which is called a T2 module) of a length of the white bar (B2) and a length of a black bar (B3) just anterior thereto. These T1 and T2 modules are referred to as a "δ distance". Note that the above arrangement of bars is the one for data characters in the left block, and a white bar is replaced with a black bar and a black bar is replaced with a white bar in an arrangement of bars for data characters in the right block.

The demodulating unit of the CPU 1 reads corresponding data on the basis of a module number of each of the T1 and T2 modules with reference to a distance demodulation table shown in FIG. 8. Note that the reference symbol "E-" of each item of data shown in FIG. 8 represents a value of an even-numbered parity, while "O-" designates a value of an odd-numbered parity.

Incidentally, in the distance demodulation table shown in FIG. 8, in the case that the number of modules included in each of the T1 and T2 modules is 3 or 4, there are two kinds of corresponding data, and any one of these items of data can not be therefore specified. Hence, in this case, the demodulating unit of the CPU 1 specifies which data it is on the basis of the module number of the black bar (B1) and the black bar (B3) with reference to a bar width demodulation table shown in FIG. 9. For example, the character A and the character B shown in FIG. 7 are demodulated as "02" or "8" with reference to the distance demodulation table shown in FIG. 8. Further, the character A is specified as "02", while the character B is specified as "08" with reference to the bar width demodulation table shown in FIG. 9.

(Bar Code Recognizing/Demodulating Process)

Next, specific contents of a bar code recognition/demodulation processing program actually executed by the CPU 1, will be explained with reference to flowcharts in FIGS. 2 through 6. According to this bar code recognizing/demodulating process, it is assumed that the reading process be successful when the demodulated data corresponding to the whole bar code are obtained by the continuous reading process (of continuously reading all the data characters between the two guard bars by one scan process), or when the demodulated data corresponding to the whole bar code are obtained based on the bar width data set read by the block reading process or by the division reading process as well as when the respective bar data sets are overlapped with each other by three or more characters in the right block.

Figure 2:
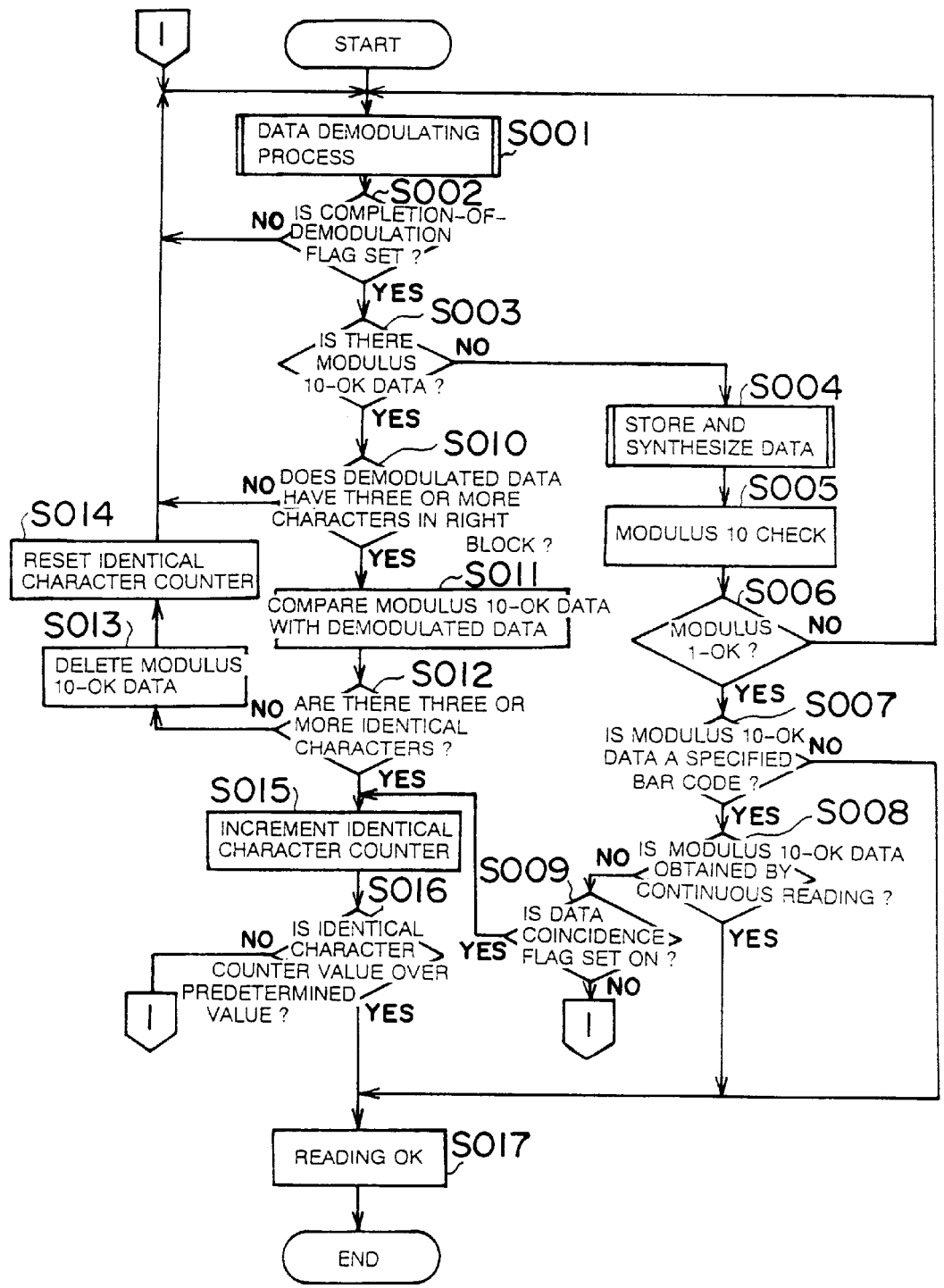
FIG. 2 is a flowchart showing contents of a bar code recognition/demodulation processing program executed by a CPU in FIG. 1.
Figure 3:
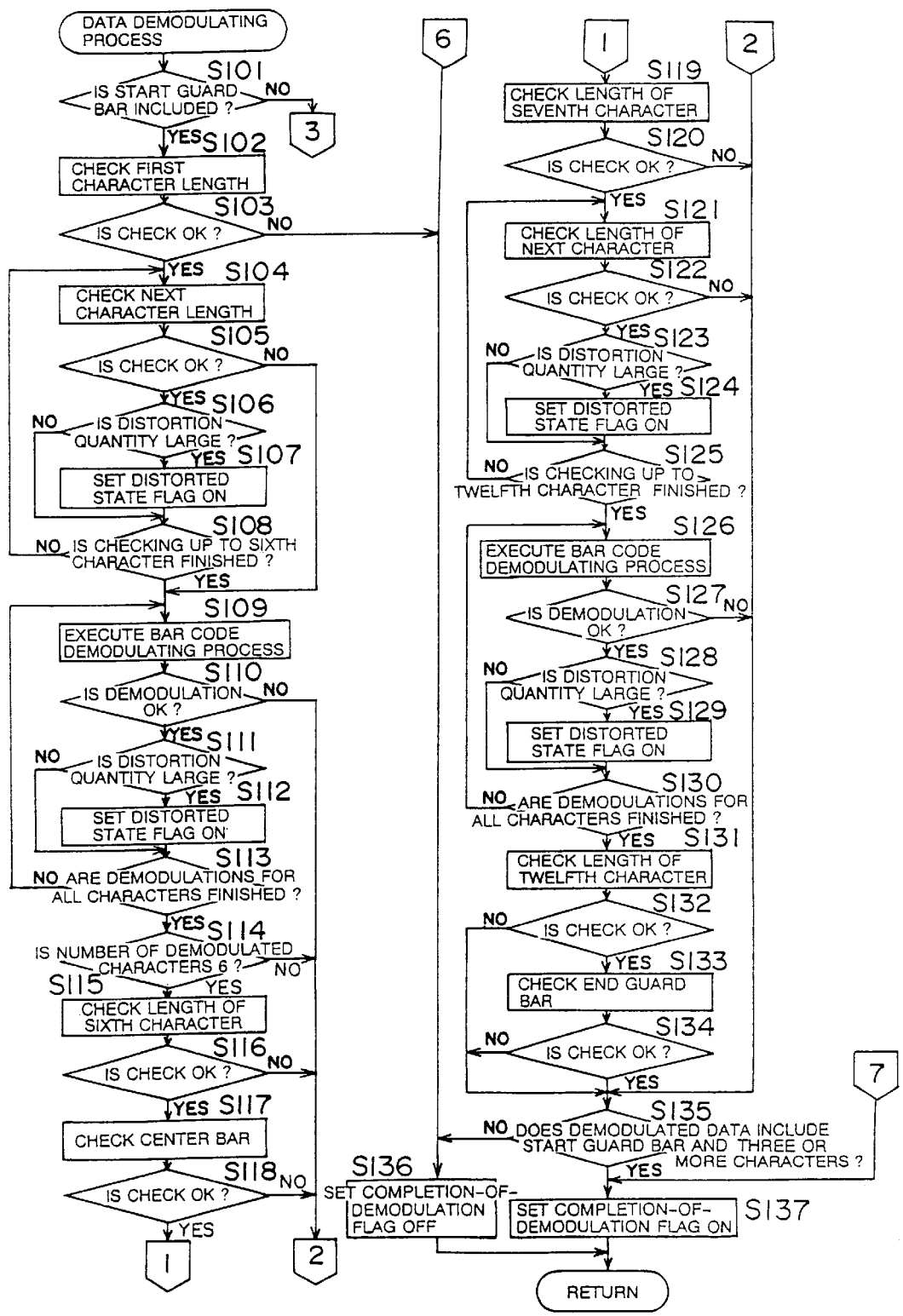
FIG. 3 is a flowchart showing a data demodulating process executed in step S002 in FIG. 2.
Figure 4:
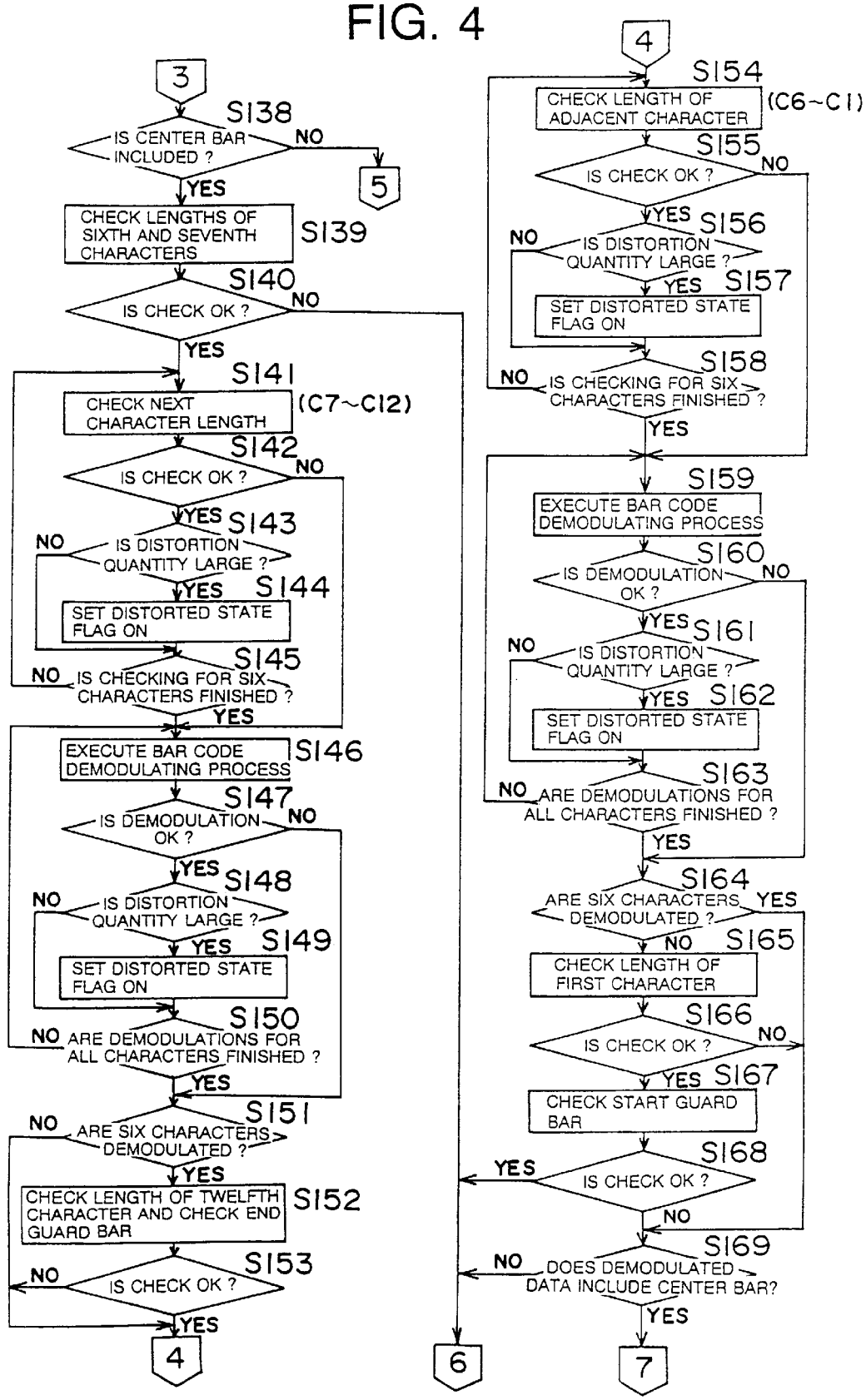
FIG. 4 is a flowchart showing the data demodulating process executed in step S002 in FIG. 2.
Figure 5:
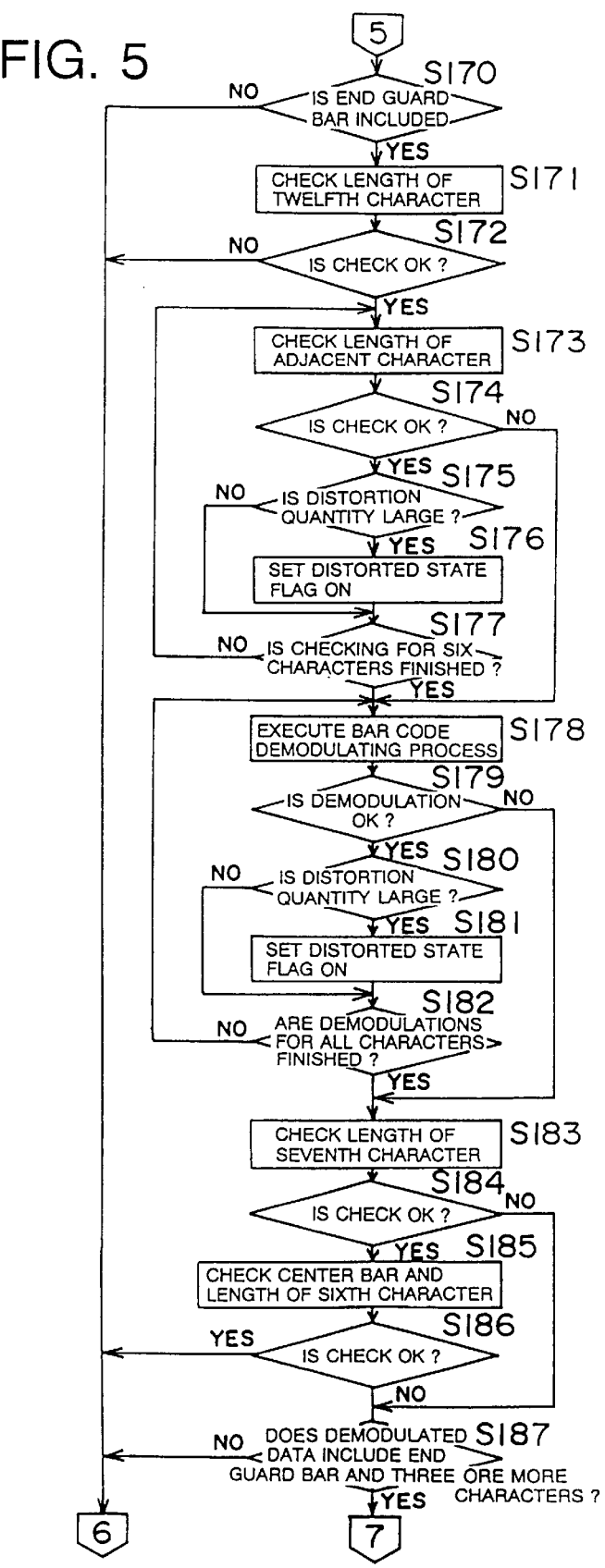
FIG. 5 is a flowchart showing the data demodulating process executed in step S002 in FIG. 2.
Figure 6:
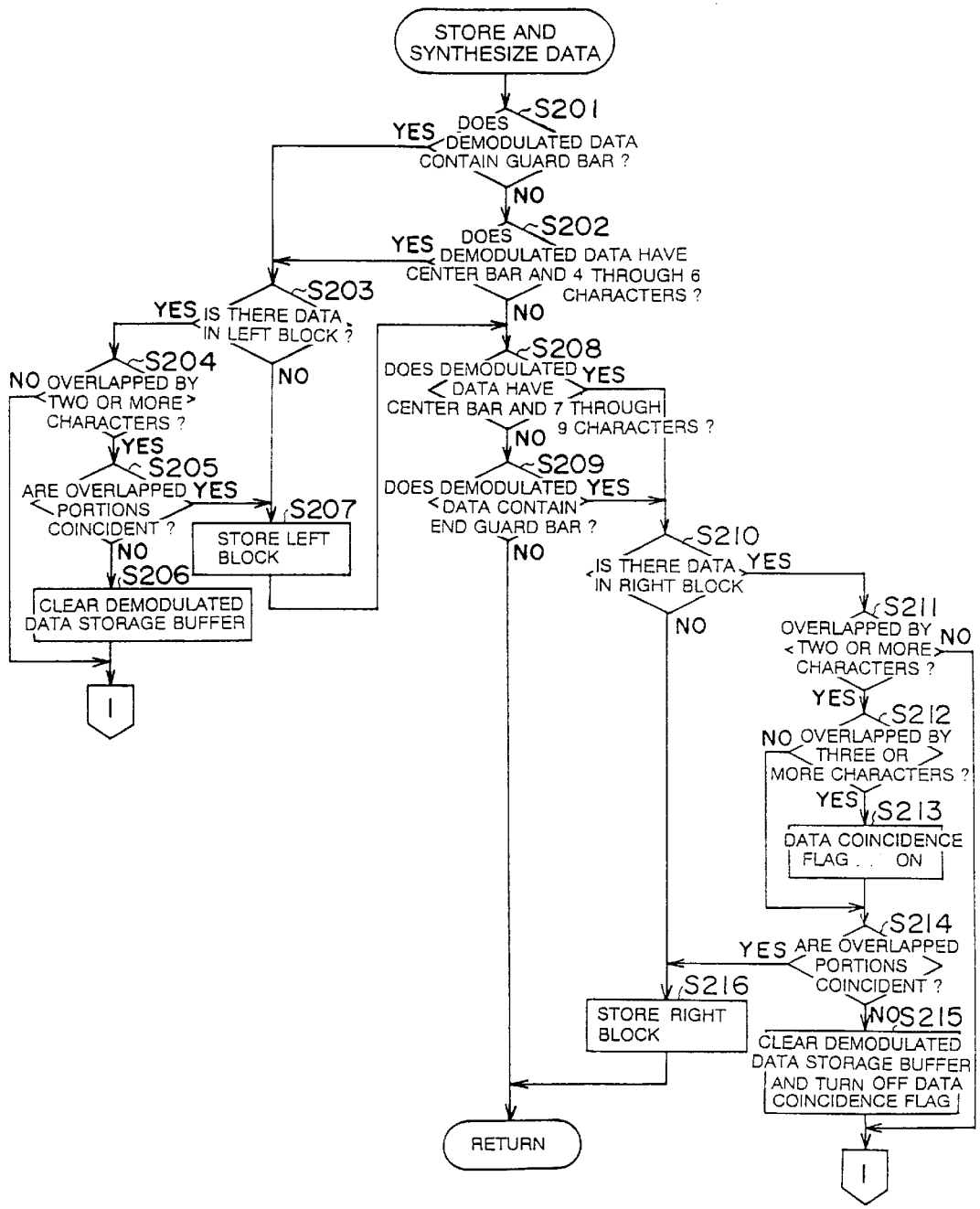
FIG. 6 is a flowchart showing a data storing/synthesizing process executed in step S004 in FIG. 2.

FIG. 2 shows a processing flow defined as main routine of the bar code recognizing/demodulating process, wherein this processing flow starts with storing a bar width data set storage buffer 2 with the bar width data set upon switching ON a main power supply of the bar code reader. In the first step S001, the CPU 1 executes a data demodulating process (corresponding to a demodulating mechanism). FIGS. 4 through 6 are flowcharts showing the data demodulating process subroutine executed in the step S001. In first step S101 after entering this subroutine, the CPU 1 fetches the oldest bar width data set from the bar width data set storage buffer 2, and checks whether the fetched bar width data set passes through the start guard bar (LGB). Then, if the same bar width data set passes through the start guard bar, the CPU 1 advances the processing to step S102. Steps S102 through S135 involve processes for demodulating the characters as far as possible to be demodulated with the start guard bar as starting point.

In step S102, the CPU 1 checks a length of a first character (next to the start bar on the side toward the center bar). More specifically, the CPU 1 checked whether a total sum of bar width count values of four bars forming the first character is in the vicinity of a fixed value or not. Then, if the length of the first character is not in the vicinity of the fixed value (S103), the CPU 1 conceives the data set as a data set based on a pattern other than the bar code, resets a "completion-of-demodulation flag" in step S136, and terminates this subroutine. Contrastingly, if the length of the first character is in the vicinity of the fixed value (S103), the CPU 1 advances the processing to step S104.

In step S104, the CPU 1 checked a length of the next character (which is defined as second character next to the first character in the initial status). Then, if the length of this character is not in the vicinity of the fixed value (S105), the CPU 1 advances the processing to step S109 to demodulate the characters in the first block of which length has hitherto been determined to be in the vicinity of the fixed value. Contrastingly, if the length of the same character is in the vicinity of the fixed value (S105), the CPU 1 checked whether a distortion quantity of the character is large or not in step S106. Subsequently, if the distortion quantity of the character is small, the CPU 1 advances the processing directly to step S108. If any one of the distortion quantities of the character is large (i.e., if a ratio between items of bar width data corresponding to the respective characters exceeds a fixed range, or if a ratio between items of bar width data corresponding to the respective modules exceeds a fixed range), the CPU 1 advances the processing to step S108 after setting a "distorted state flag" in step S107. In step S 108, the CPU 1 checks whether the checking processes of the lengths of the characters are finished up to the sixth character (adjacent to the center bar on the side toward the start bar). Then, when the checks of the lengths of the characters are finished up to the sixth character, the CPU 1 advances the processing to step S109 to demodulate the six characters constituting the first block. Whereas, if the checks of the lengths of characters are not yet finished up to the sixth character, the CPU 1 returns the processing to step S104 to check a length of the next character adjacent thereto.

In step S109, the CPU 1 fetches the character closest to the start guard bar among the characters of which lengths are determined to be in the vicinity of the fixed value in steps S103 and S105, and executes the demodulating process for the fetched character.

In next step S110, the CPU 1 checks whether the demodulating process in step S109 succeeds or not. Then, if the demodulating process does not succeed, the CPU 1 advances the processing to step S135 to finish this subroutine. If the demodulating process succeeds, the CPU 1 advances the processing to step S111. In step S111, the CPU 1 checks whether the distortion quantity of the character is large or not. Then, if the distortion quantity of the character is small, the CPU 1 advances the processing directly to step S113. Whereas, if the distortion quantity of the character is large, the CPU 1 sets the "distorted state flag" in step S112, and advances the processing to step S113. In step S113, the CPU 1 checks whether there are completed the demodulating processes corresponding to the number of all the characters of which lengths are determined to be in the vicinity of the fixed value in the character length checking in steps S103 and S105. Then, if the demodulating processes for all the characters are not yet completed, the CPU 1 returns the processing to step S109 to execute the demodulating process for the next adjacent character. In contrast with this, if the demodulating processes for all the characters are completed, the CPU 1 advances the processing to step S114.

In step S114, the CPU 1 checked whether the number of the characters that have been demodulated by the demodulating process in step S109 is 6 or not. Then, if the number of character is less than 6, there is nothing but such a possibility that the bar width data set to be processed is obtained by the "divided reading", and hence the CPU 1 advances the processing to step S135 to finish this subroutine. Contrastingly, if the number of characters that has been demodulated is 6, the CPU 1 advances the processing to step S115.

In step S115, the CPU 1 checked the length of the sixth character again. Subsequently, if the length of the sixth character is not in the vicinity of the fixed value (S116), the CPU 1 advances the processing to step S135. Contrastingly, if the length of the sixth character is in the vicinity of the fixed value (S116), the CPU 1 checks the center bar in step S117. This check of the center bar is a process of checking whether the character next adjacent to the sixth character coincides with a predetermined pattern set as the center bar. Then, when a desirable result of the center bar checking is obtained (S118), the CPU 1 advances the processing to step S119. Contrastingly, when no desirable result of the center bar checking is obtained (S118), the CPU 1 determines that the bar width data set to be processed is a bar width data set obtained by the "divided reading", and advances the processing to step S135 to finish this subroutine.

In step S119, the CPU 1 checks a length of a seventh character (next to the center bar on the side toward the end guard bar). Then, if the length of the seventh character is not in the vicinity of a fixed value (S120), the bar width data set to be processed is determined not to be the bar width data set obtained by the "continuous reading", and hence the CPU 1 advances the processing to step S135 to finish this subroutine. Whereas, if the length of the seventh character is in the vicinity of the fixed value (S120), the CPU 1 advances the processing to step S121.

In the step S121, the CPU 1 checks a length of the next character (which is an eighth character next to the seventh character in the initial status). Then, if the length of the eighth character is not in the vicinity of a fixed value (S122), the bar width data set to be processed is determined not to be the bar width data set obtained by the "continuous reading", and hence the CPU 1 advances the processing to step S135 to finish this subroutine. Whereas, if the length of the eighth character is in the vicinity of the fixed value (S122), the CPU 1 checks whether the distortion quantity of the character is large or not in step S123. Subsequently, if the distortion quantity of the character is small, the CPU 1 advances the processing directly to step S125. If the distortion quantity of the character is large, the CPU 1 advances the processing to step S125 after setting the "distorted state flag" in step S124. In step S125, the CPU 1 checks whether the checking of lengths of characters are finished up to a twelfth character (adjacent to the end guard bar on the side of the center bar). Then, if the checks of the lengths of the characters up to the twelfth character are finished, the CPU 1 advances the processing to step S126 to demodulate six pieces of characters constituting a second block. Whereas, if the checks of the lengths of the characters are not yet finished up to the twelfth character, the CPU 1 returns the processing to step S121 to check a length of the next character adjacent thereto.

In step 126, the CPU 1 fetches the character closest to the center bar among the characters of which lengths are determined to be in the vicinity of the fixed value in steps S120 and S122, and executes the demodulating process for the fetched character similarly to S109. In next step S127, the CPU 1 checked whether the demodulating process in step S126 succeeds or not. Then, if the demodulating process does not succeed, the CPU 1 advances the processing to step S135 to finish this subroutine. If the demodulating process succeeds, the CPU 1 advances the processing to step S128. In step S128, the CPU 1 checks whether the distortion quantity of the character is large or not. Then, if the distortion quantity of the character is small, the processing advances directly to step S130. Whereas, if the distortion quantity of the character is large, the CPU 1 sets the "distorted state flag" in step S129 and advances the processing to step S130. In step S130, the CPU 1 checks whether there are completed the demodulating processes corresponding to the number of the characters of which lengths are determined to be in the vicinity of the fixed value in the character length checking or not in steps S120 and S122. Then, if the demodulating processes for all the characters are not yet completed, the CPU 1 returns the processing to step S126 to execute the demodulating process for the next adjacent character. In contrast with this, if the demodulating processes for all the characters are completed, the CPU 1 advances the processing to step S131.

In step S131, the CPU 1 checks the length of the twelfth character again. Subsequently, if the length of the twelfth character is not in the vicinity of the fixed value (S132), the CPU 1 advances the processing to step S135. If the length of the twelfth character is in the vicinity of the fixed value (S132), the CPU 1 checks the end guard bar in step S133. This check of the end guard bar is a process of checking whether the character next adjacent to the twelfth character coincides with a predetermined pattern set as the end guard bar. Then, when a desirable result of the end guard bar checking is obtained (S134), the CPU 1 determines that the bar width data set to be processed is the bar width data set obtained by the "continuous reading", and therefore advances processing to step S135. Contrastingly, when no desirable result of the end guard bar checking is obtained (S134), the CPU 1 determines that the bar width data set to be processed is the bar width data set obtained at least by the "block reading", and therefore advances the processing to step S135 to finish this subroutine.

In step S135, the CPU 1 checks whether the data completely demodulated in steps S109 and S126 include the start guard bar and three or more characters or not. Then, if the completely demodulated data include the start guard bar and the three or more characters, the bar width data set to be processed can be determined to be the bar width data set obtained by at least the "divided reading", and hence the CPU 1 sets a "completion-of-demodulation flag" in step S137 and thus terminates this subroutine. Contrastingly, if the same data do not include the start guard bar and the three or more characters, a reliability on the data is comparatively low, and hence the CPU 1 resets the "completion-of-demodulation flag" in step S136, and terminates this subroutine.

On the other hand, when it is judged that the bar width data set does not include the start guard bar in step S001, there is no such possibility that the bar width data set to be processed is obtained by the "continuous reading", and hence the CPU 1 advances the processing to step S138. In step S138, the CPU 1 checks whether the bar width data set to be processed passes through the center bar. Then, if the center bar is included therein, the CPU 1 advances the processing to step S139. Steps S139 through S169 involves processes for demodulating the characters as far as possible to be demodulated in bilateral directions with the center bar as the center point.

In step S139, the CPU 1 checks the lengths of the sixth and seventh characters. Then, if both of the lengths of the sixth and seventh characters are not in the vicinity of the fixed value (S140), the CPU 1 conceives that the bar width data set to be processed is a data set based on a pattern other than the bar code. In this case, the CPU 1 resets the "completion-of-demodulation flag" in step S136, and terminates this subroutine. In contrast with this, if any one of the lengths of the sixth and seventh characters is in the vicinity of the fixed value (S140), the CPU 1 advances the processing to stem S141.

In step S141, the CPU 1 checked a length of the adjacent character (which is the seventh character in the initial status) on the side toward the end guard bar. Subsequently, if the length of the same adjacent character is not in the vicinity of the fixed value (S142), the CPU 1 advances the processing to step S146 to demodulate the characters in the second data block of which length has hitherto been determined to be in the vicinity of the fixed value. Contrastingly, if the length of this character is in the vicinity of the fixed value (S142), the CPU 1 checks whether the distortion quantity of the character is large or not in step S143. Then, if the distortion quantity of the character is small, the CPU 1 advances the processing directly to step S145. Whereas, if the distortion quantity of the character is large, the CPU 1 sets the "distorted state flag" in step S144, and thereafter advances the processing to step S145. In step S145, the CPU checked whether the checking of the lengths of the six characters forming the second data block is finished. Then, if the checks of the lengths of the six characters are finished, the CPU 1 advances the processing to step S146 to demodulate those six characters. Whereas, if the checks of the lengths of the six characters are not yet finished, the CPU 1 returns the processing to step S141 to check a length of the next adjacent character.

In step S146, the CPU 1 fetchs the character closest to the center bar among the characters of which lengths are determined to be in the vicinity of the fixed value in steps S142, and executes the demodulating process for the fetched character similarly to step S109. In next step S147, the CPU 1 checks whether the demodulating process in step S146 succeeds or not. Then, if the demodulating process does not succeed, the CPU 1 advances the processing directly to step S151. If the demodulating process succeeds, the CPU 1 advances the processing to step S148. In step S148, the CPU 1 checks whether the distortion quantity of the character is large. Then, if the distortion quantity of the character is small, the CPU 1 advances the processing directly to step S150. Whereas, if the distortion quantity of the character is large, the CPU 1 sets the "distorted state flag" in step S149, and advances the processing to step S150. In step S150, the CPU 1 checks whether there are completed the demodulating processes corresponding to the number of all characters of which lengths are determined to be in the vicinity of the fixed value in the character length checking in step S142. Then, if the demodulating processes for all the characters are not yet completed, the CPU 1 returns the processing to step S146 to execute the demodulating process for the next adjacent character. In contrast with this, if the demodulating processes for all the characters are completed, the CPU 1 advances the processing to step S151.

In step S151, the CPU checks whether the number of the characters that have been demodulated by the demodulating process in step S146 is 6. Then, if the number of the character is less than 6, the CPU 1 advances the processing to step S154 to demodulate the characters included in the first data block. Contrastingly, if the number of the characters that have been demodulated is 6, the CPU 1 advances the processing to step S152.

In step S152, the CPU 1 checks the length of the twelfth character again, and checks the end guard bar. Subsequently, in any case (S153), the CPU 1 advances the processing to step S154 to demodulate the characters included in the first data block.

In step S154, the CPU 1 checks a length of the adjacent character (which is the sixth character in the initial status) on the side toward the start guard bar. Then, if the length of this adjacent character is not in the vicinity of the fixed value (S155), the CPU 1 advances the processing to step S159 to demodulate the characters in the first data block of which length has hitherto been determined to be in the vicinity of the fixed value. Contrastingly, if the length of the same character is in the vicinity of the fixed value (S155), the CPU 1 check whether the distortion quantity is large or not in step S156. Then, if the distortion quantity of the character is small, the CPU 1 advances the processing directly to step S158. Whereas, if the distortion quantity of the character is large, the CPU 1 sets the "distorted state flag" in step S157, and thereafter advances the processing to step S158. In step S158, the CPU 1 checks whether the checking of the lengths of the six characters forming the first data block is finished.

Then, if the checks of the lengths of the six characters are finished, the CPU 1 advances the processing to step S159 to demodulate those six characters. Whereas, if the checks of the lengths of the six characters are not yet finished, the CPU 1 returns the processing to step S154 to check a length of the next adjacent character.

In step S159, the CPU 1 fetches the character closest to the center bar among the characters of which lengths are determined to be in the vicinity of the fixed value in steps S155, and executes the demodulating process for the fetched character. In next step S160, the CPU 1 checks whether the demodulating process in step S159 succeeds or not. Then, if the demodulating process does not succeed, the CPU 1 advances the processing directly to step S164. If the demodulating process succeeds, the CPU 1 advances the processing to step S161. In step S161, the CPU 1 checks whether the distortion quantity of the character is large or not. Then, if the distortion quantity of the character is small, the CPU 1 advances the processing directly to step S163. Whereas if the distortion quantity is large, the CPU 1 sets the "distorted state flag" in step S162, and thereafter advances the processing to step S163. In step S163, the CPU 1 checks whether there are completed the demodulating processes corresponding to the number of all characters of which lengths are determined to be in the vicinity of the fixed value in the character length checking in step S155. Then, if the demodulating processes for all the characters are not vet completed, the CPU 1 returns the processing to step S159 to execute the demodulating process for the next character. In contrast with this, if the demodulating processes for all the characters are completed, the CPU 1 advances the processing to step S164.

In step S164, the CPU 1 checks whether the number of the characters that have been demodulated by the demodulating process in step S159 is 6. Then, if the number of the characters is 6, the CPU 1 advances the processing to step S169. If less than 6 characters, the CPU 1 advances the processing to step S165.

In step S165, the CPU 1 checks the length of the first character. If the length of the first character is not in the vicinity of the fixed value (which passes through a case where the first character is lost) (S166), the CPU 1 advances the processing to step S169. Whereas, if the length of the first character is in the vicinity of the fixed value (S166), the CPU 1 the start guard bar checks in step S167. Then, if the start guard bar is detected (S168), the CPU 1 determines that this is contradictory to the determination made in step S101, and hence resets the "completion-of-demodulation flag" in step S136, thus finishing this subroutine. Whereas, if the start guard bar is not detected (S168), the CPU 1 advances the processing to step S169.

In step S169, the CPU 1 checks whether the completely demodulated data set has such a construction that characters are continuously linked to both sides of the center bar. Then, if the data set has the construction, the CPU 1 sets the "completion-of-demodulation flag" in step S137, and terminates this subroutine. Contrastingly, if the data set does not have the above-described construction, this implies a situation that might hardly happen, and the reliability of the data set is low.

Therefore, the CPU 1 resets the "completion-of-demodulation flag" in step S136, and terminates this subroutine.

On the other hand, when it is judged that the bar width data set does not include the center bar in step S138, the bar width data set to be processed is not obtained by the "block reading", the CPU 1 advances the processing to step S170.

In step S170, the CPU 1 checks whether the bar width data set to be processed passes through the end guard bar. Then, if the end guard bar is included therein, the data width data set is conceived as based on a pattern other than the bar code. In this case, the CPU 1 resets the "completion-of-demodulation flag" in step S136, and terminates this subroutine. In contrast with this, if the bar width data set passes through the end guard bar, the CPU 1 advances the processing to step S171. Steps S171 through S187 involve processes for demodulating the characters as far as possible to be demodulated in direction toward the center bar with the end guard bar as the starting point.

In step S171, the CPU 1 checks the length of the twelfth character. Subsequently, if the length of the twelfth character is not in the vicinity of the fixed value (S172), the bar width data set is conceived as a data set based on a pattern other than of the bar code. In this case, the CPU 1 resets the "completion-of-demodulation flag" in step S136, and terminates this subroutine. In contrast with this, if the length of the twelfth character is in the vicinity of the fixed value (S172), the CPU 1 advances the processing to step S173.

In step S173, the CPU 1 checks a length of the adjacent character (which is the eleventh character in the initial status) on the side toward the center bar. Subsequently, if the length of the same adjacent character is not in the vicinity of the fixed value (S174), the CPU 1 advances the processing to step S178 to demodulate the characters in the second data block of which length has hitherto been determined to be in the vicinity of the fixed value. Contrastingly, if the length of this character is in the vicinity of the fixed value (S174), the CPU 1 checks whether the distortion quantity of the character is large or not in step S175. Then, if the distortion quantity of the character is small, the CPU 1 advances the processing directly to step S177. Whereas, if the distortion quantity of the character is large, the CPU 1 sets the "distorted state flag" in step S176, and thereafter advances the processing to step S177. In step S177, the CPU 1 checks whether the checking of the lengths of the six characters forming the second data block is finished. Then, if the checks of the lengths of the six characters are finished, the CPU 1 advances the processing to step S178 to demodulate those six characters. Whereas, if the checks of the lengths of the six characters are not yet finished, the CPU 1 returns the processing to step S173 to check a length of the next adjacent character.

In step S178, the CPU 1 fetchs the character closest to the end guard bar among the characters of which lengths are determined to be in the vicinity of the fixed value in steps S172 or S174, and executes the demodulating process for the fetched character. In next step S179, the CPU 1 checks whether the demodulating process in step S178 succeeds or not. Then, if the demodulating process does not succeed, the CPU 1 advances the processing directly to step S183. If the demodulating process succeeds, the CPU 1 advances the processing to step S180. In step S180, the CPU 1 checks whether the distortion quantity of the character is large or not. Then, if the distortion Quantity of the character is small, the CPU 1 advances the processing directly to step S182. Whereas, if the distortion quantity of the character is large, the CPU 1 sets the "distorted state flag" in step S181, and advances the processing to step S182. In step S182, the CPU 1 checks whether there are completed the demodulating processes corresponding to the number of all characters of which lengths are determined to be in the vicinity of the fixed value in the character length checking in step S172 or S174. Then, if the demodulating processes for all the characters are not yet completed, the CPU 1 returns the processing step S178 to execute the demodulating process for the next adjacent character. In contrast with this, if the demodulating processes for all the characters are completed, the CPU 1 advances the processing to step S183.

In step S183, the CPU 1 checks the length of the seventh character. Then, if the length of the seventh character is not in the vicinity of the fixed value (which passes through a case where the seventh character is lost) (S184), the CPU 1 advances the processing to step S187. Whereas, if the length of the seventh character is in the vicinity of the fixed value (S184), the CPU 1 checks the center bar and the length of the sixth character in steps S185. Then, if the center bar is detected, or if the length of the sixth character is in the vicinity of the fixed value (S186), the CPU 1 determines that this is contradictory to the determination made in step S138. Hence, the CPU 1 sets the "completion-of-demodulation flag" in step S136, and terminates this subroutine. Whereas, if the center bar is not detected (S186), the CPU 1 advances the processing to step S187.

In step S187, the CPU 1 checks whether the data completely demodulated in step S178 include the end guard bar and three or more characters. Then, if the completely demodulated data include the end guard bar and the three or more characters, the bar width data set to be processed can be determined to be the bar width data set obtained by at least the "divided reading", hence the CPU 1 sets the "completion-of-demodulation flag" in step S137, and terminates this subroutine. Contrastingly, if the same data do not include the end guard bar and the three or more characters, the reliability on the data is comparatively low, hence the CPU 1 resets the "completion-of-demodulation flag" in steps S136, and terminates this subroutine.

After finishing the data demodulating process, the CPU 1 returns the processing to the main routine in FIG. 2, and checks in step S002 whether or not the "completion-of-demodulation flag" is set in a RAM area in a CPU 43. This "completion-of-demodulation flag" indicates that the bar width data set has been demodulated by the data demodulating process in step S001. If this "completion-of-demodulation flag" is not set, the CPU 1 discards the bar width data set that should be processed this time, and returns the processing to step S001 in order to execute the demodulating process with respect to the bar width data set newly fetched out of the bar width data set storage buffer 2.

Whereas if the "completion-of-demodulation flag" is set, the CPU 1 checks in step S003 whether or not the demodulated data with a modulus 10-OK flag are stored in a demodulated data storage buffer 7. This modulus 10-OK flag is set by a modulus 10 check process in step S005. Then, if the demodulated data storage buffer 7 is not stored with the demodulated data with the modulus 10-OK flag, the CPU 1 advances the processing to step S004.

In stem S004, the CPU 1 executes a data storing process and a data synthesizing process (corresponding to a synthesizing unit). In this data storing/synthesizing process, the CPU 1 copies, into the demodulated data storage buffer 7, the demodulated data written to a demodulated data temporary saving buffer 6 as a result of the data demodulating process in stem S001, thereby synthesizing the demodulated data corresponding to the whole bar codes. This synthesizing is done based on any one of the guard bars or/and the center bar (CB) which are certainly contained in the demodulated data by applying each piece of demodulated data to a UPC format defined on the demodulated data storage buffer 7.

FIG. 6 is a flowchart showing a data storing/synthesizing process subroutine executed in step S004. In first step S201 after entering this subroutine, the CPU 1 checks whether or not the start guard bar is contained in the demodulated data written to the demodulated data temporary saving buffer 6. Then, if the start guard bar is contained in the demodulated data, the CPU 1 advances the processing to step S203. Whereas if the start guard bar is not contained in the demodulated data, the CPU 1 checks whether or not the center bar and the fourth through sixth characters are contained in the demodulated data written to the demodulated data temporary saving buffer 6. Then, the CPU 1, if the center bar and the fourth to sixth characters are contained in the demodulated data, advances the processing to step S203, and, whereas if not, advances the processing to steps S208.

In step S203, the CPU 1 checks whether or not the corresponding demodulated data are written to a part of or the whole of the left block of the UPC code prescribed on the demodulated data storage buffer 7. Then, if the corresponding demodulated data are absolutely not written to the left block, the CPU 1 advances the processing to step S207.

On the other hand, if the corresponding demodulated data are written to a part or the whole of the left block of the UPC code prescribed on the demodulated data storage buffer 7, the CPU 1 checks in step S204 whether or not the demodulated data already written to the demodulated data storage buffer 7 and the demodulated data written to the demodulated data temporary saving buffer 6 are overlapped with each other by two or more characters (herein, there is no necessity to check whether or not numerical data of the overlapped portion are coincident with each other). Then, if not overlapped by the two or more characters, it is assumed that there is no assurance about a reliability of the demodulated data after being synthesized even if synthesized, and the CPU 1 returns the processing to step S001 (in this case, the demodulated data stored int eh demodulated data temporary saving buffer 6 are to be overwritten by the demodulated data obtained by a next data demodulating process).

By contrast, if the demodulated data already written to the demodulated data storage buffer 7 and the demodulated data written to the demodulated data temporary saving buffer 6 are overlapped with each other by the two or more characters, the CPU 1 checks whether or not the numerical data of the two sets of demodulated data in the overlapped portion are coincident with each other. Then, if the numerical data of the two sets of demodulated data are not coincident with each other, the CPU 1 judges that both of the two sets of demodulated data are not reliable and, after clearing the demodulated data storage buffer 6 in step S206, returns the processing to step S001. On the other hand, the CPU 1, when judging in step S205 that the numerical data of the two sets of demodulated data in the overlapped portion are coincident with each other, advances the processing to step S207.

In step S207, the CPU 1 writes the left block of the demodulated data written to the demodulated data temporary saving buffer 6 so as to be set in the UPC code format prescribed on the demodulated data storage buffer 7 on the basis of the start guard bar or the center bar (which corresponds to the synthesizing unit). After executing the process in step S207, the CPU 1 advances the processing to step S208.

In step S208, the CPU 1 checks whether or not the center bar and the seventh to ninth characters are contained in the demodulated data written to the demodulated data temporary saving buffer 6. Then, the CPU 1, if the center bar and the seventh to ninth characters are contained in the demodulated data, advances the processing to step S210. Whereas if the center bar and the seventh to ninth characters are not contained in the demodulated data, the CPU checks in step

S209 whether or not the end guard bar is contained in the demodulated data written to the demodulated data temporary saving buffer 6. Then, the CPU 1, if the end guard bar is contained in the demodulated data, advances the processing to step S210 and, whereas if not, finishes the data storing/synthesizing subroutine.

In step S210, the CPU 1 checks whether or not the corresponding demodulated data are written to a part or the whole of the right block of the UPC code prescribed on the demodulated data storage buffer 7. Then, if the corresponding demodulated data are absolutely not written to the right block, the CPU 1 advances the processing to step S216.

On the other hand, if the corresponding demodulated data are written to a part of or the whole of the right block of the UPC code prescribed on the demodulated data storage buffer 7, the CPU 1 checks in step S211 whether or not the demodulated data already written to the demodulated data storage buffer 7 and the demodulated data written to the demodulated data temporary saving buffer 6 overlapped with each other by two or more characters (herein, there is no necessity to check whether or not numerical data of the overlapped portion are coincident with each other). Then, if not overlapped by the two or more characters, the CPU assumes that there is no assurance about the reliability of the demodulated data after being synthesized even if synthesized, and returns the processing to step S001 (in this case, the demodulated data stored in the demodulated data temporary saving buffer 6 are to be overwritten by the demodulated data obtained by a next data demodulating process).

By contrast, if the demodulated data already written to the demodulated data storage buffer 7 and the demodulated data written to the demodulated data temporary saving buffer 6 are overlapped with each other by the two or more characters, the CPU 1 checks in step S212 whether or not the demodulated data already written to the demodulated data storage buffer 7 and the demodulated data written to the demodulated data temporary saving buffer 6 are overlapped with each other by three or more characters (herein, there is no necessity to check whether or not numerical data of the overlapped portion are coincide with each other) (which corresponds to an overlap judging unit). Then, the CPU 1, if not overlapped by the three or more characters, advances the processing directly to step S214. If overlapped by the three or more characters, the CPU 1 sets a data coincidence flag in the RAM area of the CPU 1 in step S213, and thereafter advances the processing to step S214.

In step S214, the CPU 1 checks whether or not the numerical data of the two sets of demodulated data in the overlapped portion are coincident with each other (corresponding to a coincidence judging unit). Then, if the numerical data of the two sets of demodulated data are not coincident with each other, the CPU 1 judges that both of the two sets of demodulated data are not reliable and, after resetting the data coincidence flag by clearing the demodulated data storage buffer 6 in step S215, returns the processing to step S001. On the other hand, the CPU 1, when judging in step S214 that the numerical data of the two sets of demodulated data in the overlapped portion are coincident with each other, advances the processing to step S216.

In step S216, the CPU 1 writes the right block of the demodulated data written to the demodulated data temporary saving buffer 6 so as to be set in the UPC code format prescribed on the demodulated data storage buffer 7 on the basis of center bar or the end guard bar (which corresponds to the synthesizing unit). After executing the process in step S216, the CPU 1 finishes this data storing/synthesizing subroutine.

After finishing the data storing/synthesizing process, the CPU 1 returns the processing to the main routine in FIG. 2, and, in step S005, executes a modulus 10 check process with respect to the demodulated data stored in the demodulated data storage buffer 7. This modulus 10 check is a check process of judging whether or not the demodulated data corresponding to the whole bar codes are obtained by the synthesizing process in step S004. More specifically, the CPU 1 classifies into, odd- and even-numbered positions, all the numeral data contained in the demodulated data, wherein the odd-numbered position is set on the rightmost side in the demodulated data stored in the demodulated data storage buffer 7. Then, the CPU 1 calculates a sum of a triple of a total sum of values of the numerical data existing in the odd-numbered positions and of a total sum of values of the numerical data existing in the even-numbered positions. Then, the CPU 1, if the calculated value is a multiple of 10, judges that the demodulated data corresponding to the whole bar codes have been synthesized, and sets a modulus 10-OK flag to the same demodulated data.

In next step S006, the CPU 1 checks whether or not the modulus 10-OK flag is set to the demodulated data stored in the demodulated data storage buffer 7 as a result of the modulus 10 check performed in step S005. Then, if the modulus 10-OK flag is not yet set, the CPU 1 judges that all the demodulated data are not prepared, returns the processing to step S001 in order to execute the demodulating process with respect to the bar width data set newly fetched out of the bar width data set storage buffer 2.

In contrast with this, as a result of repeating a loop of process in steps S001–S006, when the modulus 10-OK flag is set to the demodulated data stored in the demodulated data storage buffer 7, the CPU 1 judges that the data synthesizing is completed as a consequence of executing the process in step S004, with the demodulated data obtained by the continuous reading process, and advances the processing from step S006 to step S007. In this step S007, the CPU 1 checks whether or not the demodulated data with the modulus 10-OK flag (which is hereinafter referred to as "modulus 10-OR data") are defined as a specified bar code. For example, the CPU 1 checks whether or not the demodulated data are an in-store marking bar code such as a 02/20 bar code. Subsequently, the CPU 1, if the modulus 10-OK data is not the specified bar code, advance the processing directly to step S017, and, if the modulus 10-OK data is the specified bar code, advances the processing to step S008.

In step S008, the CPU 1 checks whether or not the modulus 10-OK data is the demodulated data obtained based on the continuous reading process. Then, the CPU 1, if the modulus 10-OK data is the demodulated data obtained based on the continuous reading process, advances the processing directly to step S017, and, if the modulus 10-OK data is the demodulated data obtained based on the block reading process or the division reading process, advances the processing to step S009.

In step S009, the CPU 1 checks whether or not the data coincident flag is set in the RAM area of the CPU 1. Then, if the data coincidence flag is set therein, which implies that the numerical data are overlapped with each other by three or more characters in the right block, the CPU 1 therefore advances the processing to step S015. Whereas if the data coincidence flag is not set therein, which implies that the numerical data are not overlapped with each other by the three or more characters in the right block, the CPU 1 therefore returns the processing to step S001.

In step S003 executed after the processing has been returned from step S009 to step S001, the CPU 1 judges that the modulus 10-OK flag is set to the demodulated data stored in the demodulated data storage buffer 7, and advances the processing to step S010. In this step S010, the CPU 1 checks whether or not the latest demodulated data contain three or more characters of the numerical data in the right block (corresponding to the overlap judging unit). Subsequently, the CPU 1, if the latest demodulated data do not contain the three or more characters of the numerical data in the right block, returns the processing to step S001, and, if the latest demodulated data contain the three or more characters of the numerical data in the right block, advances the processing to step S011.

In step S011, the CPU 1 compares the modulus 10-OK data with the latest demodulated data in a state where the center bar or the end guard bar contained in the latest demodulated data is aligned with the corresponding bar in the modulus 10-OK data.

In next step S012, the CPU 1 checks based on a result of the comparison in step S011 whether or not the modulus 10-OK data and the latest demodulated data are coincident with each other by three or more characters in the right block (corresponding to the coincidence judging unit). Then, if these two sets of data are coincident with each other by the three or more characters in the right block, the CPU 1 advances the processing to step S015.

In step S015, the CPU 1 increments an identical character counter (an initial value is "0") for counting with software the number of pieces of demodulated data coincident with the modulus 10-OK data by the three or more characters in the right block.

In next step S016, the CPU 1 checks whether or not a count value of the identical character count is over a predetermined value (e.g., "2"). Then, if the count value does not yet reach the predetermined value, the CPU 1 returns the processing to step S001.

As a result of the check in the S012, when the CPU 1 judges in step S012 that the modulus 10-OK data and the latest demodulated data are not coincident with each other by the three or more characters in the right block, a loop of process in steps S001–S003, steps S010–S012, step S015 and step S016 are executed. In this case, the CPU 1 judges that there be a possibility in which either of the right block of the modulus 10-OK data and the latest demodulated data is obtained by a reverse reading process in the right block, and deletes the modulus 10-OK data stored in the demodulated data storage buffer 7. Then, the CPU 1 resets in step S014 the identical character counter, and thereafter returns the processing to step S001.

Further, as a result of repeating the loop of processes in steps S001–S003, steps S010–S012, step S015 and step S016, the CPU 1, when judging in step S016 that the count value of the identical character counter reaches the predetermined value, advances the processing to step S017.

In step S017, the CPU 1 executes a "reading OK" process. In this "reading OK" process, the CPU 1 validates the modulus 10-OK data stored in the demodulated data storage buffer 7 as demodulated data corresponding to the whole bar codes (corresponding to a demodulating unit), and emits a voice indicating a completion of having read (demodulated) the bar codes out of a loud speaker 10. Then, the CPU 1 displays, on a light emitting diode 11, information on a sales price etc of the commercial goods 20 that correspond to the modulus 10-OK data (the demodulated data corresponding to the whole bar codes). Upon a completion of the "reading OK" process, the CPU 1 finishes the bar code recognition/demodulation processing program.

(Operation of Present Embodiment)

An operation of the present embodiment will hereinafter be discussed with reference to FIGS. 10 through 13.

FIG. 10 shows a case where demodulation data containing the end guard bar can be demodulated after obtaining the modulus 10-OK data based on the division reading process. To describe it more specifically, there is shown a case in which, first, the demodulated data A based on the division reading process which data A contains the start guard bar is obtained, and thereafter the demodulated data B containing the whole of the right block and a part of the left block is obtained. In this case, if the two pieces of demodulated data A, B are coincident with each other by two or more characters, the data are synthesized within the demodulated data storage buffer 7 (steps S004, S207). If a condition in the modulus 10 check is satisfied, a modulus 10-OK flag is set (step S005). At this point of time, however, since the numerical data are not overlapped in the right block, the data coincidence flag is not set (step S009). Accordingly, a count value of the identical character counter remains to be the initial value.

Thereafter, when obtaining the demodulated data C including the end guard bar and the numerical data of three characters, the CPU 1 aligns the demodulated data C with the modulus 10-OK data obtained by synthesizing the demodulated data A with the demodulated data B on the basis of the end guard bar, and compares tenth to twelfth characters (of the numerical data) of the two sets of data with each other (step S011). As a result of this comparison, if the tenth to twelfth characters (of the numerical data) of the two sets of data with each other, the CPU 1 judges that there is a high probability that the demodulated data C and the demodulated data B serving as a basis of the modulus 10-OK data are obtained by correctly reading the right block of the bar code, and increments the identical character counter (steps S012, S015). When the count value of the identical character counter comes to a predetermined value (e.g., "2"), the CPU 1 executes the "reading OK" process (steps S016, S017).

FIG. 11 shows a case where demodulated data containing the center bar is obtained after obtaining the modulus 10-OK data based on the division reading process. To explain it more specifically, there is shown a case in which, first, the demodulated data A based on the division reading process which data A contains the start guard bar is obtained, and thereafter the demodulated data B containing the whole of the right block and a part of the left block is obtained. In this case, if the two pieces of demodulated data A, B are coincident with each other by the two or more characters, the data are synthesized within the demodulated data storage buffer 7 (steps S004, S207). If the condition in the modulus 10 check is satisfied, the modulus 10-OK flag is set (step S005). At this point of time, however, since the numerical data are not overlapped in the right block, the data coincidence flag is not set (step S009). Accordingly, the count value of the identical character counter remains to be the initial value.

Thereafter, when obtaining the demodulated data C including the center bar and the numerical data of three characters, the CPU 1 aligns the demodulated data C with the modulus 10-OK data obtained by synthesizing the demodulated data A with the demodulated data B on the basis of the center bar, and compares seventh to ninth characters (of the numerical data) of the two sets of data with each other (step S011). As a result of this comparison, if the seventh to ninth characters (of the numerical data) of the two sets of data coincide with each other, the CPU 1 judges that there is a high probability that the demodulated data C and the demodulated data B serving as a basis of the modulus 10-OK data are obtained by correctly reading the right block of the bar code, and increments the identical character counter (steps S012, S015). When the count value of the identical character counter comes to the predetermined value (e.g., "2"), the CPU 1 executes the "reading OK" process (stems S016, S017).

FIG. 12 shows a case where respective sets of demodulated data are overlapped with each other by three or more characters in the right block on the occasion of obtaining the modulus 10-OK data based on the block reading process. To describe it more specifically, there is shown a case in which, first, the demodulated data A based on the block reading process which data A contains the whole of the left block and a part of the right block is obtained, and thereafter the demodulated data B containing the whole of the right block is obtained. In this case, if the seventh to ninth characters of the demodulated data A coincide with the seventh to ninth characters of the demodulated data B, the data coincidence flag is set (step S009). Then, the identical character counter is incremented (steps S009, S015) on condition that a result of the modulus 10 check is OK (steps S005, S006). When the count value of the identical character counter comes to the predetermined value (e.g., "2"), the CPU 1 executes the "reading OK" process (steps S016, S017).

Note that if the seventh to ninth characters (of the numerical data) of the two sets of demodulated data A, B are not coincident with each other, there might be produced a possibility in which the demodulated data B is obtained by reversely reading the right block of the bar code. Accordingly, in this case, the CPU 1 deletes all the data within the demodulated data storage buffer 6 (step S215), and re-executes the bar code recognizing/demodulating process from the beginning.

FIG. 13 shows an example of a case where two pieces of demodulated data are overlapped with each other by three or more characters in the right block on the occasion of obtaining the modulus 10-OK data on the basis of two pieces of demodulated data each obtained by the division reading process and a single piece of demodulated data obtained by the block reading process. To explain it more specifically, there is shown a case in which, first, the demodulated data containing a part of the right block and a part of the left block with the center bar interposed therebetween is obtained after the demodulated data A including the start guard bar as well as being based on the division reading process has been obtained, and finally the demodulated data C containing the whole of the right block is obtained. In this case, if the demodulated data A and the demodulated data B are coincident with each other by two or more characters, and if the seventh to ninth characters of the demodulated data B are each coincident with the seventh to ninth characters of the demodulated data C, the data coincidence flag is set (step S009). Then, the identical character counter is incremented (steps S009, S015) on condition that a result of the modulus 10 check is OK (steps S005, S006). When the count value of the identical character counter comes to the predetermined value (e.g., "2"), the CPU 1 executes the "reading OK" process (steps S016, S017).

Note that if the seventh to ninth characters (of the numerical data) of the two respective sets of demodulated data B, C are not coincident with each other, there might be produced a possibility in which the demodulated data C is obtained by reversely reading the right block of the bar code. Accordingly, in this case, the CPU 1 deletes all the data within the demodulated data storage buffer 6 (step S215), and re-executes the bar code recognizing/demodulating process from the beginning.

Though the illustration is omitted, if the modulus 10-OK data is obtained based on the demodulated data by the continuous reading process (step S008), the "reading OK" process is executed unconditionally (step S017).

Though the illustration is omitted, if the modulus 10-OK data is obtained based on the demodulated data obtained by reading the bar code other than a specified bar code (step S007), the "reading OK" process is implemented unconditionally (step S017).

As discussed above, according to the bar code reading in this embodiment, after the modulus 10-OK data has been once acquired, no acquisition of the demodulation data is made except for an acquisition of the minimum demodulated data for confirming that the demodulated data having become a basis of this piece of modulus 10-OK data is the data not obtained by reversely reading the right block of the bar code. Namely, the acquisitions of the modulus 10-OK data, which should be made a plurality of times, are not the condition of the "reading OK" process. Hence, the bar code recognizing/demodulating process can be completed for a short period of time while keeping the reliability of the demodulated data.

According to the thus constructed bar code reader and the bar code reading method of the present invention, when the demodulated data corresponding to the whole bar codes are once reproduced based on the demodulated data obtained by the block reading process or the division reading process, there is checked whether or not the plural pieces of demodulated data are overlapped with each other with respect to only the right block. As a result, it is feasible to complete the demodulation for a short period of time without causing any misreading attributed to the reverse reading in the right block.

It is apparent that, in this invention, a wide range of different working modes can be formed based on the invention without deviating from the spirit and scope of the invention. This invention is not restricted by its specific working modes except being limited by the appended claims.

We claim:

1. A bar code reader scanning a bar code containing three identifying bars each having a fixed pattern and data characters of two blocks interposed between the identifying bars, detecting a bright/dark pattern on a trajectory of the scanning, and demodulating data coded into the bar code on the basis of the bright/dark pattern, said reader comprising:

a demodulating unit obtaining plural pieces of demodulated data by demodulating the bright/dark patterns on the trajectories each passing through at least one of the three identifying bars;

a demodulated data synthesizing unit obtaining the demodulated data corresponding to all of the bar code by synthesizing the plural pieces of demodulated data obtained by said demodulating unit;

an overlap judging unit judging whether or not the plural pieces of demodulated data obtained by said demodulating unit demodulates the bright/dark patterns on the trajectories each passing through any one of the blocks overlap at least partially in the block;

a coincidence judging unit judging whether or not overlapped portions of the plural pieces of demodulated data judged by said overlap judging unit as being overlapped are coincident with each other; and a demodulated data validating unit validating the demodulated data reproduced by said demodulated data synthesizing unit only when said coincidence judging unit judges that the overlapped portions are coincident with each other within the predetermined block where the reverse reading of the bright/dark patterns is not detected.

2. The bar code reader according to claim 1, wherein the bar code is a UPC code, a JAN code or an EAN code, and wherein the identifying bars are a start guard bar, a center bar and an end guard bar.

3. The bar code reader according to claim 2, wherein one of the blocks is interposed between the center bar and the end guard bar.

4. The bar code reader according to claim 1, wherein said overlap judging unit judges whether or not the demodulated data obtained by said demodulating unit after said demodulated data synthesizing unit has synthesized the demodulated data and any one piece of demodulated data synthesized by said demodulated data synthesizing unit are overlapped at least partially in any one of the blocks.

5. The bar code reader according to claim 1, wherein said overlap judging unit judges whether or not the plural pieces of demodulated data synthesized by said demodulated data synthesizing unit overlap at least partially in any one of the blocks.

6. The bar code reader according to claim 1, wherein said overlap judging unit judges that the plural pieces of demodulated data overlap when the plural pieces of demodulated data overlap by three or more characters.

7. A bar code reading method of scanning a bar code containing three identifying bars each having a fixed pattern and data characters of two blocks interposed between the identifying bars, detecting a bright/dark pattern on a trajectory of the scanning, and demodulating data coded into the bar code on the basis of the bright/dark pattern, said method comprising:

a step of demodulating the bright/dark patterns on the trajectories each passing through at least one of the three identifying bars;

a step of obtaining the demodulating data corresponding to all of the bar code by synthesizing the plural pieces of demodulated data obtained by demodulating the bright/dark patterns; and a step of validating the demodulated data corresponding to all of the bar code only when the plural pieces of demodulated data obtained by demodulating the bright/dark patterns on the trajectories each passing through any one of the blocks overlap at least partially in the block and the overlapped portions of each of demodulated data are coincident with each other within the predetermined block where the reverse reading of the bright/dark patterns is not detected.

8. A computer readable medium stored with a bar code program for enabling a computer to which bright/dark pattern data obtained by scanning a bar code obtaining three identifying bars each having a fixed pattern and data characters of two blocks interposed between the identifying bars are inputted, to execute:

a step of demodulating the bright/dark patterns on the trajectories each passing through at least one of the three identifying bars;

a step of obtaining the demodulated data corresponding to all of the bar code by synthesizing the plural pieces of demodulated data obtained by demodulating the bright/dark patterns;

a step of judging whether or not the plural pieces of demodulated data obtained by demodulating the bright/ dark patterns on the trajectories each passing through any one of the blocks are overlapped at least partially in the block;

a step of judging whether or not, when judging that the plural pieces of demodulated data overlap at least partially in the block, the overlapped portions are coincident with each other; and a step of validating the demodulated data corresponding to all of the bar code only when it is judged that the overlapped portions are coincident with each other within the predetermined block where the reverse reading of the bright/dark patterns is not detected.

9. The bar code reader according to claim 1, wherein said bar code is a UPC code having the two blocks arranged left and right, and wherein said demodulated data validating unit validates the demodulated data only when said overlap judging unit judges that overlapped positions are coincident with each other within the right block of the UPC code.

10. The bar code reading method according to claim 7, wherein said bar code is a UPC code having the two blocks arranged left and right, and wherein the demodulated data is validated only when the overlapped portions are coincident with each other within the right block of the UPC code.

11. The computer readable medium according to claim 8, wherein said bar code is a UPC code having the two blocks arranged left and right, and wherein the demodulated data is validated only when it is judged that the overlapped portions are coincident with each other within the right block of the UPC code.

* * * * *